Feb. 9, 1954  F. E. PORTER  2,668,328
METHOD OF CASTING PATTERNED PLASTIC SHEETS
Filed April 8, 1953
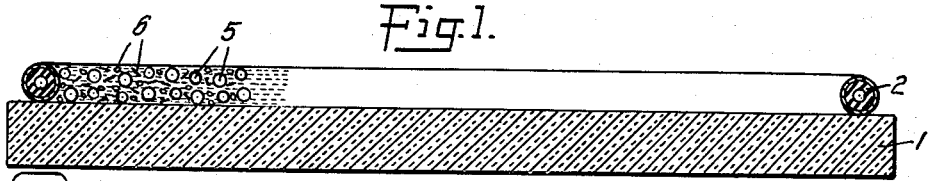
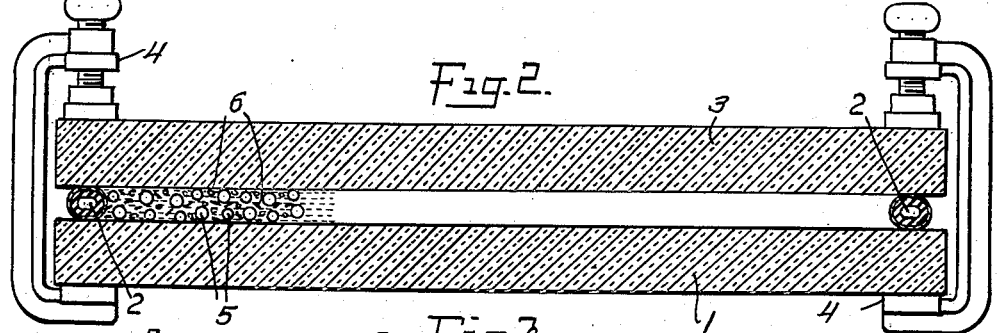
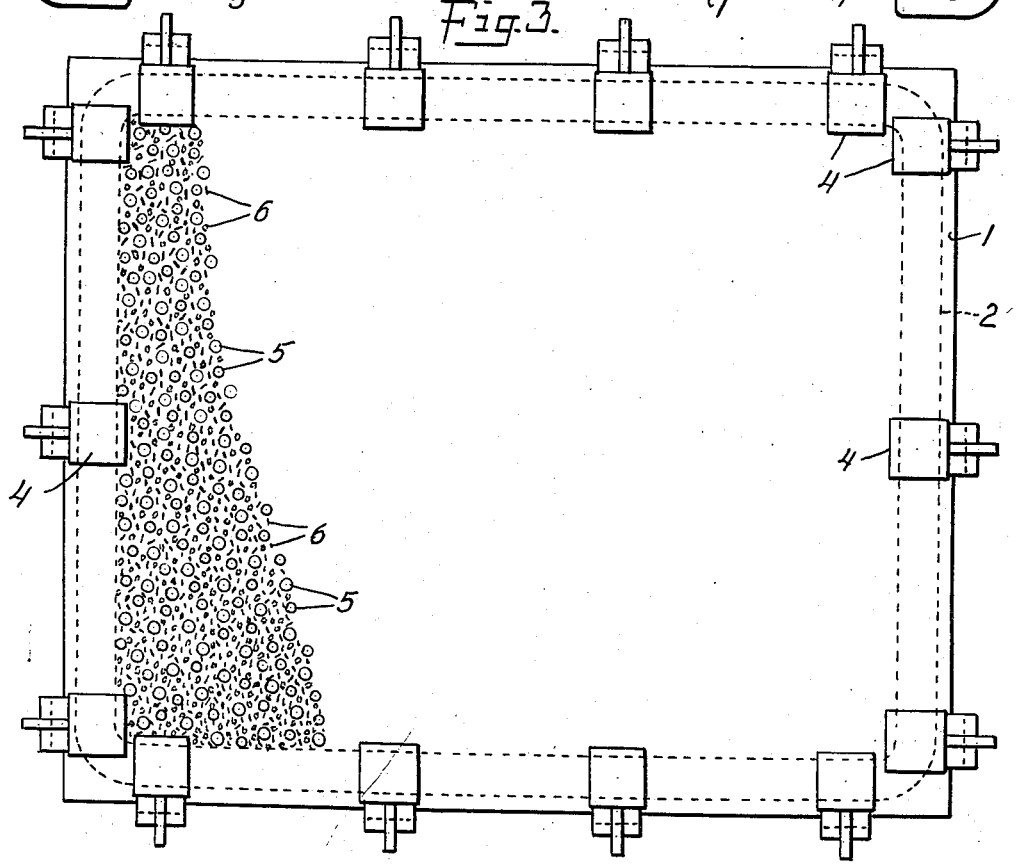
INVENTOR
Frank E. Porter
BY
ATTORNEYS Patented Feb. 9, 1954

2,668,328

UNITED STATES PATENT OFFICE 2,668,328

METHOD OF CASTING PATTERNED PLASTIC SHEETS

Frank E. Porter, Denville, N. J., assignor to U. S. Chemical Corporation, Metuchen, N. J., a corporation of New Jersey Application April 8, 1953, Serial No. 347,555

5 Claims. (Cl. 18—58)

This invention relates to preparation of cast synthetic resins and, more specifically to the preparation of such resins in the form of sheets containing pattern forming additives, and the primary object of the present invention is to provide a process of effecting a controlled orientation of pattern forming additives of cast synthetic resin sheet.

According to this invention the pattern forming material, such as pearl essence from fish scales, metal bronze powders, pigments of various kinds, and dyes, both as liquid and powders, is added directly to a polymerizable liquid organic compound such as methyl methacrylate monomer in such manner that the cast sheet presents a beautiful pattern formed by the additives, which pattern may be readily altered and controlled by simple variations in certain steps of the operation all as will hereinafter be more fully described.

The principal novel step in the process is the incorporation in the mixture of the synthetic resin to be cast and the pattern forming additives, of amounts of resin in the form of solid spheres or beads of selected mesh size which, in the process of casting, move in the heated mixture until the increasing viscosity of the plastic as it "sets" prevents further movement of the beads. In this movement, which may, in the molding of sheets for example, be accomplished by turning the mold to a vertical plane, each bead carries with it a glob of viscous resin containing the pattern forming additive which in turn carries with it to a greater or less extent the contiguous resin, producing a controlled directional distribution of the additive, which in the final product forms a distinctive and reproducible pattern which may be modified by changes in the quantity and size of the added beads; in the viscosity of the resin to be cast; in the kind and quantity of the additives and otherwise.

The process may be carried out with the apparatus commonly used for the manufacture of plastic sheets and forms, and in the accompanying drawings I have shown a typical mold used for molding sheets of acrylic resins.

In the said drawings:

Fig. 1 shows in section the open mold immediately after it is filled with plastic material;

Fig. 2 is a sectional view of the enclosed mold; and

Fig. 3 is a side elevation of the mold positioned for the setting of the plastic and showing the distribution of the ingredients of the plastic at the beginning of the setting period.

Referring to the drawings, 1 and 3 are glass plates between which the plastic sheet is formed. The sheets are spaced apart by a compressible gasket 2 in the form of a continuous ring of a shape and size corresponding with the plates 1 and 3. The gasket 2 is placed at the edge of one plate as shown in Fig. 1 and the required amount of the heated plastic poured on the plate. The second plate is placed on top of the gasket and the clamps 4 applied over the edges of the assembled plates and gasket and screwed down, care being taken to maintain the plates parallel so that the molded sheet will be of uniform thickness throughout. After filling the mold, it is placed in a controlled temperature bath for polymerization.

The following are examples of the procedure followed in the commercial manufacture of sheets in accordance with this invention using the above-described apparatus.

Example No. 1

Monomeric methyl methacrylate containing 0.025% acetyl peroxide as a polymerizing catalyst and the reflective sheen material is heated at 87° C. until it is a syrup with viscosity of "$u$," "$v$," "$w$," Gardner-Holdt viscosimeter comparison control, at room temperature. One of the formulas commonly used for this syrup is the following:

| | Parts |
|---|---|
| Methyl methacrylate monomer | 4490 |
| Pearl essence | 50 |
| Acetyl peroxide (dimethyl phthylate) catalyst | 1.14 |

From the above syrup at room temperature a precalculated amount is removed to produce a sheet .150" in thickness. To this syrup transparent beads of acrylic resin of the desired dimensions are added. The quantity of beads in proportion to the amount of syrup and thickness of the sheet to be cast modifies the pattern in the resulting sheet. Beads in the order of 5 grams per pound of methyl methacrylate of approximately 20 mesh size will produce a pleasing mother-of-pearl pattern. After the beads are added, the vessel containing the syrup is subjected to mechanical agitation for one (1) minute. The syrup, with the added beads, is then poured into a casting cell such as above described. The cell is placed directly after closing into a controlled temperature bath for polymerization in a vertical position.

In the drawings, the beads are indicated at 5 and the sheen material at 6, the showing being, of course, diagrammatic.

At the start of the polymerization immediately after the mold is placed in vertical position, the beads and sheen material are uniformly distributed throughout the resin and the sheet, as shown at the left in Fig. 3 presents no "pattern." When the mold is set on edge, the beads begin to move through the action of the gravity and the sheen material is redistributed in the manner above described.

The finished sheet contains a "mother-of-pearl" pattern which, while not made up of like areas of geometrically identical design, is of a generally similar appearance throughout the sheet and reproducible from sheet to sheet to such an extent that if a number of sheets be cut into small pieces of identical size, it would be impossible to tell from the appearance of the pieces which sheets they came from.

*Example No. 2*

The procedure followed is the same as in Example No. 1 except that viscosity of syrup is increased to "2+1," Gardner-Holdt viscosimeter tube control. The pattern in the resultant sheet is of smaller design, with individual figures approximately ¾ to 1" in size over the entire area.

The control of the design in the finished sheet as to size and intensity of striation, is a function of the pouring viscosity of base synthetic resin liquid and the temperature of the polymerization unit. The viscosity of the casting base is adjusted to ball size to control reproducible pattern. For light caliper sheeting, a spheroid ball of 10 to 30 mesh is added to the base liquid with a Gardner-Holdt controlled viscosity of "u," "v," "w" cold. For calipers from 250/ to 500/ inclusive a viscosity of "z+1" "z+2," Gardner-Holdt is used with balls of 10 to 40 mesh size. The sheets are cast in a waterbath in a vertical position and the design is created by the shifting or falling movement of the spheroid polymer through the base synthetic resin liquid containing the material producing the reflective sheen. This shift caused by the falling spheres creates a new stage of orientation in the reflective sheen material thereby creating the design. The shape and size of the design is a direct function of the viscosity of the base synthetic resin liquid and the size of the beads. For small design the viscosity is increased to reduce falling inertia of balls and for large design, the viscosity is reduced to increase falling speed of spheres. The patterns are directly reproducible in area as long as the same size spheroid synthetic resin bead is used. The pattern is throughout the entire thickness of the sheet and is not limited to one side. No further processing of cast sheeting is required after material is loaded to casting cells, designing then becomes a routine and not a manual function of the procedure.

In the foregoing examples I have described the procedure followed in making sheets having patterns formed of pearl essence added to the transparent resin. The patterns formed are generally similar in appearance to so-called mother-of-pearl with the sheen material apparently somewhat more concentrated in limited areas dispersed throughout the area of the sheet, the limited areas being in the form of irregular paths extending generally in the same direction, which direction was downward during the period that the material was setting in the molding cell. The length and width of these areas varies with the viscosity of the resin when placed in the cell and the size of the added beads.

Mother-of-pearl patterns may be formed in sheets of any color by adding to the resin a dye in liquid form which gives a color to the sheet without rendering it opaque. In the finished sheet the dye appears to have a greater concentration in the limited areas where the sheen material appears to be more concentrated, but this may be due to the greater opacity of the sheet in these areas. Instead of using sheen material for forming the patterns, metallic powders in the form used for making paints, such as bronze powder or aluminum powder, may be employed. These powders are apparently re-oriented in the mass by the downward movement of the beads in the same manner as the pearl essence. Pigments other than metallic powders may also be employed and also liquid dyes may be employed without sheen material.

The beads should preferably be formed of resin of the same composition as the sheet material, so that the beads, to the extent that they are melted during the setting of the resin, will blend with and form part of the sheet.

When the pearl essence or other reflective sheen material is added to the semi-liquid resin before casting without the addition of the beads, it is impossible to effect a distribution of the material throughout the resin in such manner as to produce a controlled and reproducible pattern no matter how carefully the agitation of the mixture of semi-liquid plastic and the reflective sheen material is controlled, and no matter how exactly such agitation is reproduced the distribution of the sheen material will not be reproduced and the resulting pattern is entirely unpredictable. Apparently the beads in some manner control the distribution of the sheen material, and if beads in the same number and size be added to the same liquid plastic and the viscosity of the plastic and other conditions of the casting process be carefully reproduced, the resulting pattern will be substantially the same in the separately cast sheets. Also, as pointed out above, the resulting pattern may be controlled by varying the size and number of the beads and the viscosity of the semi-liquid plastic at the time the beads are added to the plastic and the mixture agitated as described.

In the foregoing specification I have described in detail my improved process as carried out in the commercial manufacture of sheets of the character described, but it is to be understood that my invention is not limited to the details of the procedure herein described, but the same may be varied within the scope of the appended claims.

I claim:

1. The method of making molded articles which consists in adding to a molding composition while in a liquid state a quantity of pattern-forming material, also adding to said liquid composition discrete particles of solid material of such weight and bulk as to sink by gravity in such molding composition, placing the mixture in a mold, placing the mold in a position for such particles to move downwardly, subjecting the mold to conditions to cause the composition to solidify, and controlling the solidification of the composition so that it is not solidified until after the discrete particles have sunk a substantial distance in the composition.

2. The method of making molded articles which consists in adding to a molding composition while in a liquid state a quantity of pattern-forming material in comminuted form, also adding to said liquid material discrete solid substantially spherical particles of a composition to blend with liquid and of such weight and bulk as to sink by gravity in such molding composition, placing the mold in position for such particles to move downwardly, subjecting the mold to conditions to cause the composition to solidify, and controlling the solidification of the composition so that it is not solidified until after the particles have sunk a substantial distance in the composition.

3. The method of making molded sheets which consists in adding to the molding material while in a liquid condition a quantity of pattern-forming material of comminuted form, also adding to said liquid material a plurality of transparent beads of a composition and to be at least partially melted at the temperature of the liquid material and of such weight and bulk as to sink by gravity in said molding composition, placing the mixture in a mold, positioning the mold in a vertical plane, subjecting the mold to conditions to cause the composition to solidify, and controlling the solidification of the liquid composition so that it is not solidified until after the beads have sunk a substantial distance in the composition.

4. The process of claim 1 wherein the molded articles are sheets and the mold is set on edge while the composition is solidifying.

5. The method of claim 2 wherein the molded articles are sheets and the molds are set on edge during the setting period.

FRANK E. PORTER.

References Cited in the file of this patent

UNITED STATES PATENTS

| Number | Name | Date |
| --- | --- | --- |
| 2,168,331 | Fields | Aug. 8, 1939 |
| 2,265,226 | Clewell | Dec. 9, 1941 |
| 2,480,750 | Leary | Aug. 30, 1949 |